United States Patent
Yonezawa et al.

(10) Patent No.: US 6,902,505 B2
(45) Date of Patent: Jun. 7, 2005

(54) BLADE-TYPE TENSIONER

(75) Inventors: Shinichi Yonezawa, Nabari (JP); Naoji Sakamoto, Nabari (JP)

(73) Assignee: BorgWarner Morse TEC Japan K.K., Nabari (JP)

( * ) Notice: Subject to any disclaimer, the term of this patent is extended or adjusted under 35 U.S.C. 154(b) by 101 days.

(21) Appl. No.: 10/357,013

(22) Filed: Feb. 3, 2003

(65) Prior Publication Data

US 2003/0162615 A1 Aug. 28, 2003

(30) Foreign Application Priority Data

Feb. 26, 2002 (JP) ........................................ 2002-049842

(51) Int. Cl.[7] ................................................. F16H 7/08
(52) U.S. Cl. ........................ 474/111; 474/101; 474/140
(58) Field of Search ................................ 474/101, 109, 474/111, 119, 133, 140, 104

(56) References Cited

U.S. PATENT DOCUMENTS

| | | | | |
|---|---|---|---|---|
| 3,276,282 A | * | 10/1966 | Duncan ...................... | 474/111 |
| 6,036,613 A | * | 3/2000 | Diehm ........................ | 474/111 |
| 6,364,796 B1 | * | 4/2002 | Nakamura et al. .......... | 474/111 |
| 2004/0005953 A1 | * | 1/2004 | Yonezawa et al. .......... | 474/111 |

FOREIGN PATENT DOCUMENTS

| | | | | |
|---|---|---|---|---|
| GB | 000581219 A1 | * | 2/1994 | ................. 474/111 |
| JP | 2000-234656 | | 8/2000 | ............. F16H/7/08 |

* cited by examiner

Primary Examiner—Thomas R. Hannon
Assistant Examiner—Vicky A. Johnson
(74) Attorney, Agent, or Firm—Brown & Michaels, PC; Greg Dziegielewski

(57) ABSTRACT

A blade-type tensioner for applying tension to a chain comprising a base, an arcuately shaped blade shoe having a chain sliding face, a spring provided on a back side of the blade shoe, and a guide member. The blade shoe has a proximal end portion and a distal end portion, where the proximal end portion is swingably supported on the base, and the distal end portion is slidably supported on a slide plate of the base. The slide plate is arcuately shaped to form a concavely arcuate arc face on an opposite side of the distal end portion of the blade shoe, and the distal end portion of the blade shoe has a convexly arcuate arc face corresponding to the concavely arcuate arc face of the slide plate. The distal end portion of the blade shoe is guided by a self-aligning action of the concavely arcuate arc face of the slide plate in such a way that the distal end portion is centrally positioned in a lateral direction on the slide plate. The guide member comprises a pair of guide portions formed integrally on opposite side edges of the distal end portion of the blade shoe, and hang below opposite side ends of the slide plate.

8 Claims, 6 Drawing Sheets

BLADE-TYPE TENSIONER

REFERENCE TO RELATED APPLICATIONS

This application claims an invention, which was disclosed in Japanese application number 2002-049842, filed Feb. 26, 2002, entitled "Blade-Type Tensioner." The benefit under 35 USC§ 119(a) of the Japanese application is hereby claimed, and the aforementioned applications are hereby incorporated herein by reference.

BACKGROUND OF THE INVENTION

1. Field of the Invention

The invention pertains to the field of blade tensioners. More particularly, the invention pertains to a blade tensioner with a blade shoe that is self aligning.

2. Description of the Art

A blade-type tensioner is used to impart tension on a chain. A blade-type tensioner generally includes a plastic blade shoe with an arcuately curved chain sliding face, a plurality of leaf-spring-shaped blade springs provided opposite the chain sliding face, and a metal base that swingably supports a proximal end portion of the blade shoe and that slidably supports a distal end portion of the blade shoe. During operation, a chain slides and travels along the chain sliding face of the blade shoe and a resilient force due to the elastic deformation of the blade shoe and the blade spring is applied to the chain through the blade shoe and proper chain tension is maintained.

In prior art Japanese patent publication no. 2000-234656, a blade tensioner having a pair of guide portions is provided on the base to guide the travel of the distal end portion of the blade shoe when the distal end portion slides on the base. These guide portions are formed integral with the slide surface on the opposite edge portions thereof and are bent along a direction perpendicular to the slide surface. Each guide portion has a convexly curved surface on the opposing side to the distal end portion of the blade shoe, thereby decreasing the sliding resistance between each guide portion and blade shoe, allowing smooth movement of the blade shoe to occur. The convexly curved surface of the guide portion is generally formed by ironing the guide portion several times prior to bending, making the manufacturing of the prior art blade tensioner laborious.

SUMMARY OF THE INVENTION

The present invention is directed to a blade-type tensioner for applying tension to a chain comprising a base, an arcuately shaped blade shoe having a chain sliding face swingably supported on the base, and a leaf-shaped blade spring provided on the back side of the chain sliding face of the blade shoe. The distal end portion of the blade shoe is slidably supported by a slide plate provided on the base. The slide plate is arcuately curved to have a concavely arcuate arc surface opposite the distal end portion of the blade shoe. The distal end portion of the blade shoe has a convexly arcuate arc surface that corresponds to the concavely arcuate arc surface of the slide plate.

During operation, the distal end portion of the blade shoe comes in contact with and slides on the slide plate, specifically the convexly arcuate arc face of the distal end portion of the blade shoe contacts the concavely arcuate arc face of the slide plate. The concavely arcuate arc face of the slide plate performs a guiding function as a result of a self-aligning action that takes place relative to the convexly arcuate arc face of the distal end portion of the blade shoe. As a result, as the distal end portion of the blade shoe slides on the slide plate, the distal end portion of the blade shoe is constantly guided in such a way that the distal end portion is centrally positioned in a lateral direction on the slide plate. The slide plate is arcuately bent to aid in guiding the distal end portion of the blade shoe. The slide plate is bent and deformed by only one bending process decreasing laborious manufacturing.

In a second embodiment, the distal end portion of the blade shoe has a pair of guide portions formed integrally therewith and hanging from the opposite edges of the blade shoe below the opposite sides of the slide plate. During operation, the distal end portion of the blade shoe contacts and slides on the slide plate, each guide portion hanging from the opposite edges of the distal end portion of the blade shoe guides the movement of the distal end portion of the blade shoe on the slide plate in the lateral direction. Since the a guide portion is formed integrally with the opposite edges of the distal end portions of the blade shoe, laborious work such as ironing does not need to be applied to the base of the tensioner.

In a third embodiment, the distal end portion of the blade shoe has a through hole penetrating thereinto in the shoe-width direction. A U-shaped guide member with a pair of guide portions hanging below the opposite side ends of the slide plate is inserted into the through hole. During operation, the distal end portion of the blade shoe contacts and slides on the slide plate, each guide portion of the U-shaped guide member is inserted into the through hole of the distal end portion of the blade shoe and guides the movement of the distal end portion of the blade shoe laterally on the slide plate. Since the U-shaped guide member is inserted into the through hole of the distal end portion of the blade shoe, laborious work such as ironing does not need to be applied to the base of the tensioner.

In a fourth embodiment, each of the proximal and distal end portions of the blade shoe have grooves to receive each end portion of the blade spring. Each groove of the blade shoe has a recess formed therein to prevent each end portion of the blade spring from contacting the blade shoe. The recess on the distal end side of the blade shoe has a U-shaped guide member inserted thereinto. The U-shaped guide member has a pair of guide portions below the opposite sides of the slide plate. During operation, the distal end portion of the blade shoe contacts and slides on the slide plate, each guide portion of the U-shaped guide member is inserted into the recess of the distal end portion of the blade shoe and guides the movement of the distal end portion of the blade shoe laterally on the slide plate. Since, U-shaped guide member is inserted into the recess of the distal end portion of the blade shoe laborious work such as ironing work does not need to be applied to the base of the tensioner.

DETAILED DESCRIPTION OF THE INVENTION

Figure 1:
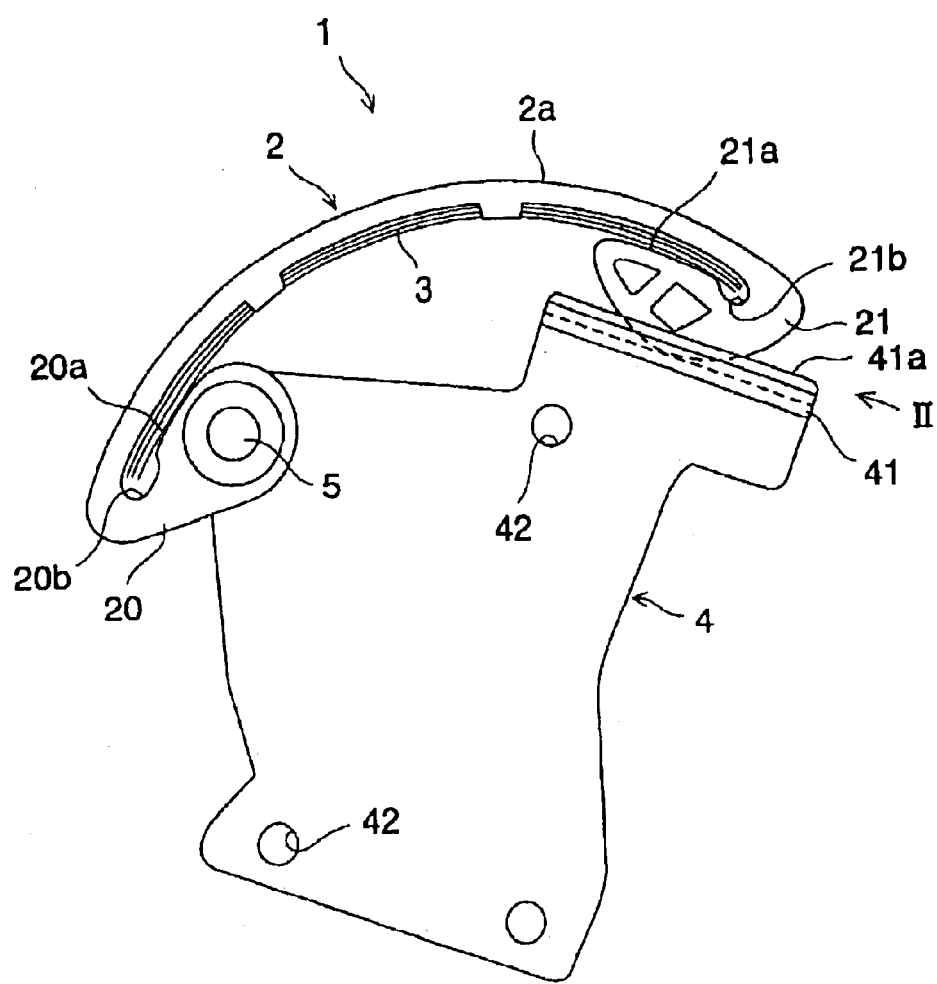
FIG. 1 shows a side view of a blade-type tensioner according to a first embodiment of the present invention.

As shown in FIG. 1, a blade-type tensioner 1 is comprised of an arcuately curved plastic blade shoe 2 with a chain sliding face 2a, a plurality of leaf-spring shaped blade springs 3 provided and laminated on the opposite side of the chain sliding face 2a adapted to impart tension to a chain (not shown) through the blade shoe 2, and a metal base 4 to which the blade shoe 2 is attached.

The blade show has a proximal and distal end. The proximal end portion 20 of the blade shoe 2 has a shoulder bolt or pin 5 inserted thereinto, one end of which is fixed to the base 4. The blade shoe 2 is swingable around the pin 5. The proximal end portion 20 of the blade shoe 2 is formed with a groove 20a having a recess 20b. The distal end portion 21 of the blade shoe 2 is slidably supported on a slide plate 41 formed integrally with the base 4. Similarly, the distal end portion 21 of the blade shoe 2 is formed with a groove 21a having a recess 21b.

One end of the blade spring 3 is inserted into the groove 20a of the proximal end portion 20 of the blade shoe 2, and the other end thereof is inserted into the groove 21a of the distal end portion 21 of the blade shoe 2. Since each groove 20a, 21a has a recess 20b, 21b formed therein respectively, the distal edge portions of the blade spring 3 are prevented from directly contacting the blade shoe 2.

Figure 2:
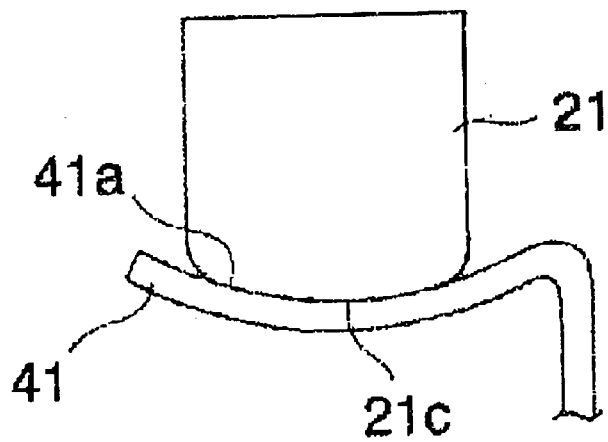
FIG. 2 shows an end view of a portion of a blade-type tensioner of FIG. 1 viewed from the direction of the arrow marked II.

The slide plate 41, shown in FIG. 2, is arcuately curved and has a concave arc face 41a on the opposing side to the distal end portion 21 of the blade shoe 2. The distal end portion 21 of the blade shoe 2 is formed with a convex arc face 21c that corresponds to the concave arc face 41a of the slide plate 41.

During operation of the blade tensioner 1, a chain (not shown) slides on and travels along the chain sliding face 2a of the blade shoe 2. During this time, a resilient restitutive force due to elastic deformation of the blade spring 3 is imparted on the chain. During deformation of the blade shoe 2 and the blade spring 3, the distal end portion 21 of the blade shoe 2 slides along the slide plate 41 with the distal end portion 21 in contact with the slide plate 41 of the base 4. At this time, the convex arc face 21c of the distal end portion 21 of the blade shoe 2 is in contact with the concave arc face 41a of the slide plate 41. The concave arc face 41a of the slide plate 41 exercises a guiding function due to its self-aligning action relative to the convex arc face 21c of the distal end portion 21 of the blade shoe 2. As a result, the distal end portion 21 of the blade shoe 2, which is constantly guided such that it is centrally located in the lateral direction (as shown in FIG. 2) on the slide plate 41, slides and travels along the slide plate 41. The arcuately curved slide plate 41 exercises the guiding function of the distal end portion 21.

Figure 4:
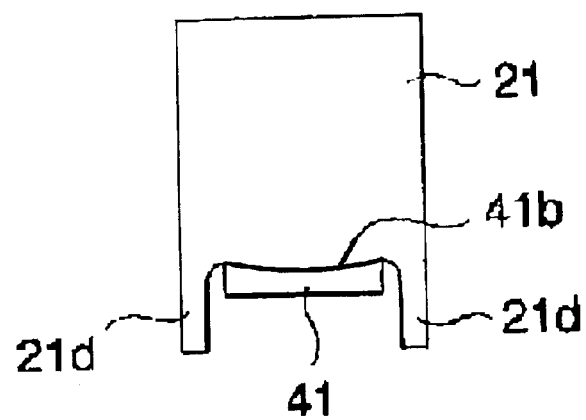
FIG. 4 shows an end view of a portion of a blade-type tensioner of FIG. 3, viewed from the direction of the arrow marked IV.
Figure 3:
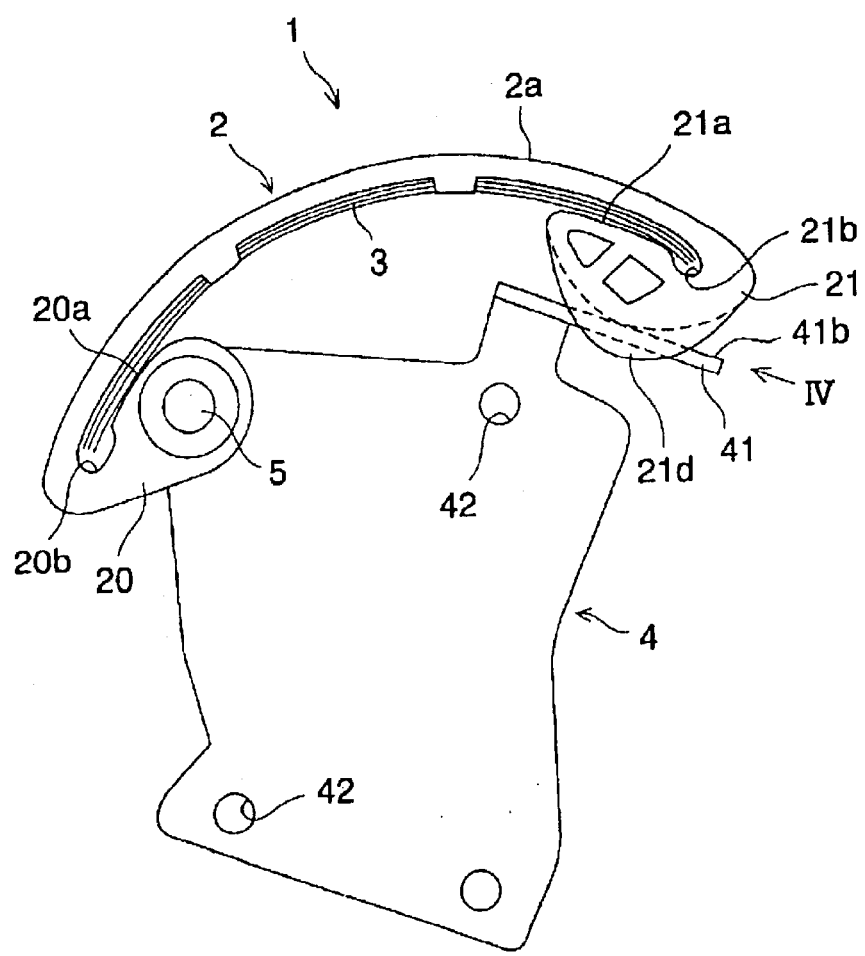
FIG. 3 shows a side view of a blade-type tensioner according to a second embodiment of the present invention.

FIGS. 3 and 4 show a second embodiment of the present invention. In these drawings, like reference numbers indicate identical or functionally similar elements to those in the first embodiment. The distal end portion 21 of the blade shoe 2 has a pair of guide portions 21d provided on opposite sides of the distal end portion 21 and hanging from the opposite side edges of the distal end portion 21. The slide plate 41 has a flat surface 41b on the opposing side to the distal end portion 21 of the blade shoe 2. Each of the guide portions 21d of the distal end portion 21 of the blade shoe 2 are formed integrally with the blade shoe 2 at the time of plastic molding of the blade shoe 2, and extend below the opposite sides of the slide plate 41.

During operation, the distal end portion 21 of the blade shoe 2 slides along the slide plate 41 with the distal end portion 21 contacting the flat surface 41b of the slide plate 41 of the base 4. At this time, each guide portion 21d constantly guides the movement of the distal end portion 21 of the blade shoe 2 on the slide plate 41 in the lateral direction, such that the distal end portion 21 is located centrally in the lateral direction on the slide plate 41. The guide portions 21d exercise the guiding function of the distal end portion 21 of the blade shoe 2.

Figure 5:
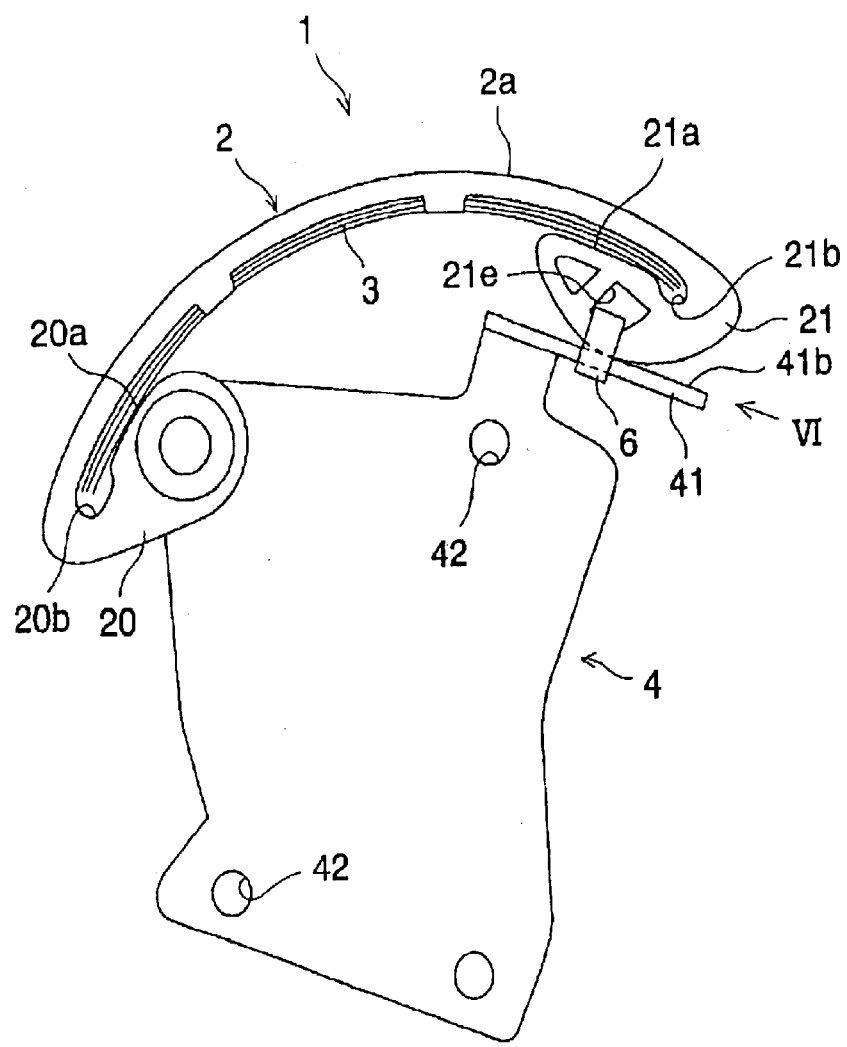
FIG. 5 shows a side view of a blade-type tensioner according to a third embodiment of the present invention.
Figure 6:
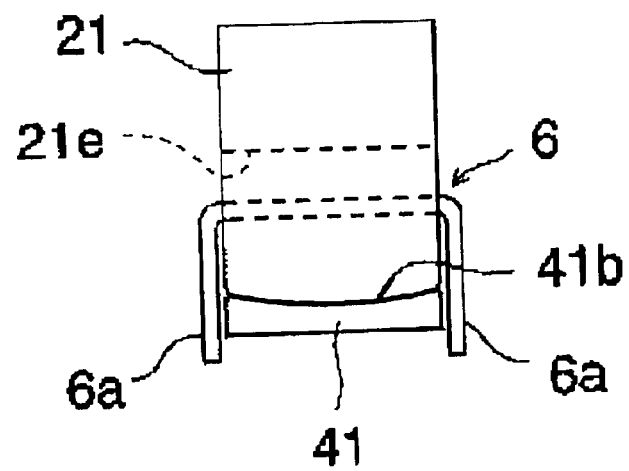
FIG. 6 shows an end view of a portion of a blade-type tensioner of FIG. 5, viewed from the direction of the arrow marked VI.

FIGS. 5 and 6 show a third embodiment of the present invention. In these drawings, like reference numbers indicate identical or functionally similar elements to those in the first and second embodiment. The distal end portion 21 of the blade shoe 2 has a through hole 21e that extends through the distal end portion 21 in the lateral direction in FIG. 6. A U-shaped guide member 6 containing a pair of guide portions 6a is provided on opposite sides of the guide member 6. The guide portions 6a extend below the opposite side ends of the slide plate 41 are inserted into the through hole 21e. The guide member 6 is preferably formed by folding a sheet metal into a U-shape.

During operation, the distal end portion 21 of the blade shoe 2 slides along the slide plate 41 with the distal end portion 21 contacting the flat surface 41b of the slide plate 41 of the base 4. At this time, each guide portion 6a of the U-shaped guide member 6 extends through the through hole 21e of the distal end portion 21 of the blade shoe 2 and constantly guides the movement of the distal end portion 21 of the blade shoe 2 laterally on the slide plate 41, such that the distal end portion 21 is centrally located in the lateral direction on the slide plate 41. The U-shaped guide piece 6 exercise the guiding function of the distal end portion 21 of the blade shoe 2.

Figure 8:
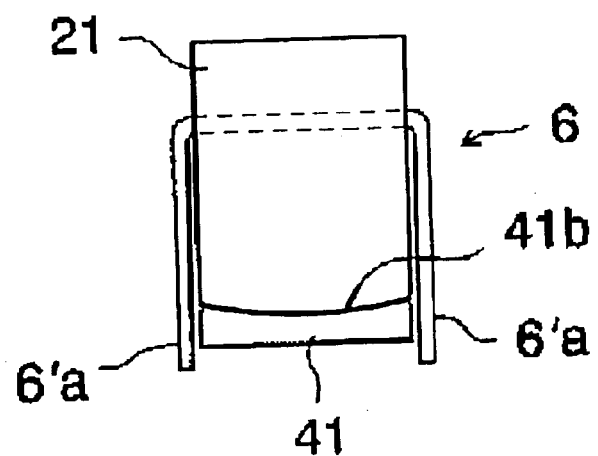
FIG. 8 shows an end view of a portion of a blade-type tensioner of FIG. 7, viewed from the direction of the arrow marked VIII.
Figure 7:
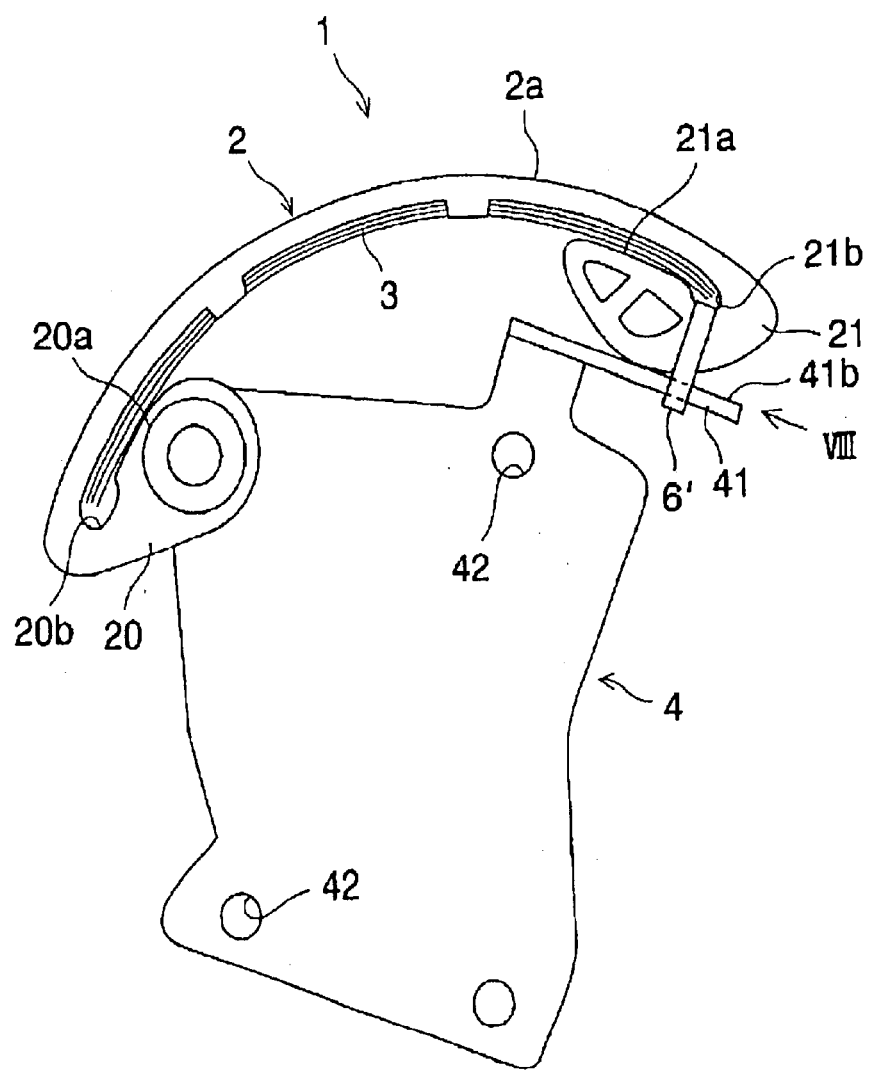
FIG. 7 shows a side view of a blade-type tensioner according to a fourth embodiment of the present invention.

FIGS. 7 and 8 show a fourth embodiment of the present invention. In these drawings, like reference numbers indicate identical or functionally similar elements to those in the first through the third embodiment. The U-shaped guide member 6', contains a pair of guide portions 6'a provided on opposite sides of the guide member 6', which extend below the opposite side ends of the slide plate 41 is inserted into the recess 21b of the distal end portion 21 of the blade shoe 2. The guide member 6', is preferably formed by folding a sheet metal into a U-shape.

During operation, the distal end portion 21 of the blade shoe 2 slides along the slide plate 41 with the distal end portion 21 contacting the flat surface 41b of the slide plate 41 of the base 4. At this time, each guide portion 6'a of the U-shaped guide member 6' guides the movement of the distal end portion 21 of the blade shoe 2 laterally on the slide plate 41 such that the distal end portion 21 is centrally located in the lateral direction on the slide plate 41. The U-shaped guide piece 6' exercises the guiding function of the distal end portion 21 of the blade shoe 2.

In each of the above-mentioned embodiments, the slide plate 41 is integrated with the base 4 by folding a part of the base 4. Furthermore, the slide plate made discretely from the base 4 may be attached to the base 4 by a known fixing means such as welding or fastening bolts.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A blade tensioner for applying tension to a chain, comprising:
    a base;
    an arcuately shaped blade shoe having a chain sliding face, a proximal end portion and a distal end portion, the proximal end portion being swingably supported on the base, the distal end portion being slidably supported on a slide plate of the base;
    a spring provided at a back side of the blade shoe; and
    a guide member comprising a pair of guide portions on opposite side edges of the distal end portion of the blade shoe, the pair of guide portions extending below the slide plate;
    wherein the distal end portion of the blade shoe is centrally positioned in a lateral direction of the slide plate.

2. The blade tensioner of claim 1, wherein the distal end portion of the blade shoe has a through hole extending transversely through the distal end portion.

3. The blade tensioner of claim 2, wherein the guide member is inserted into the through hole of the distal end portion.

4. The blade tensioner of claim 3, wherein the guide member is U-shaped.

5. The blade tensioner of claim 1, wherein the guide portions are formed integrally with the opposite side edges of the distal end portion of the blade shoe.

6. The blade tensioner of claim 1, wherein the guide member is U-shaped.

7. A blade tensioner for applying tension to a chain, comprising:
    a base;
    an arcuately shaped blade shoe having a chain sliding face, a proximal end portion and a distal end portion, the proximal end portion being swingably supported on the base, the distal end portion being slidably supported on a slide base of the base, wherein the proximal and distal end portions of the blade shoe have grooves formed therein to receive ends of the blade spring, and each of the grooves have a recess to prevent the end of the blade spring from contacting the groove;
    a spring provided at a back side of the blade shoe having grooves formed on opposite ends to receive the spring;
    wherein the recess in each groove has a U-shaped guide member inserted thereinto, the guide member having a pair of guiding portions hanging below opposite side ends of the slide plate.

8. A blade tensioner for applying tension to a chain, comprising:
    a base;
    an arcuately shaped blade shoe having a chain sliding face, a proximal end portion and a distal end portion, the proximal end portion being swingably supported on the base, the distal end portion being slidably supported on a slide plate of the base; and
    a spring provided at a back side of the blade shoe;
    wherein the distal end portion of the blade shoe has a convex arc face corresponding to a concave arc face of the slide plate and is guided by a self-aligning action of the convex arc face, such that the distal end portion is centrally positioned in a lateral direction on the slide plate.

* * * * *